E. C. BALLMAN.
ELECTRIC METER.
APPLICATION FILED NOV. 15, 1918.
1,393,737.                                   Patented Oct. 18, 1921.
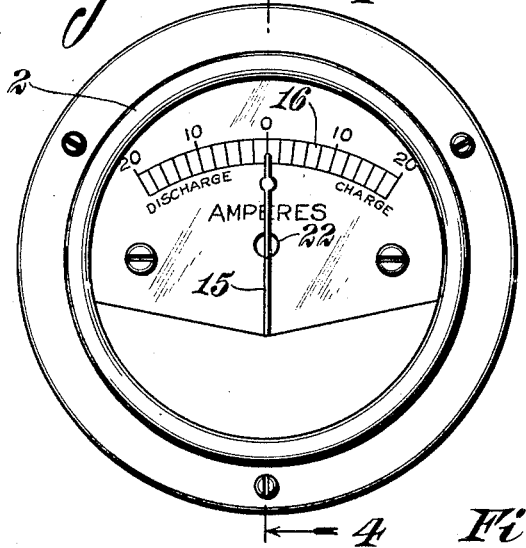
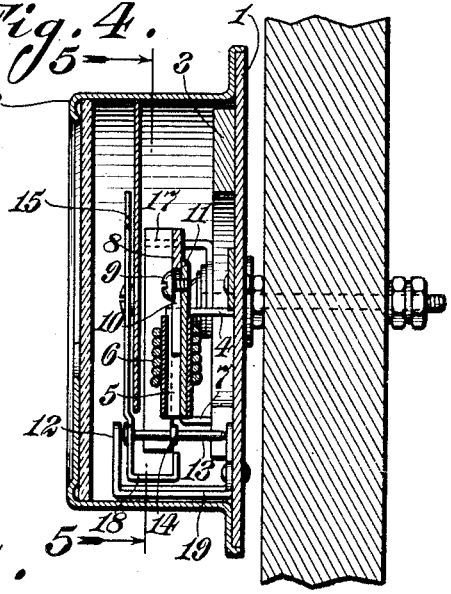
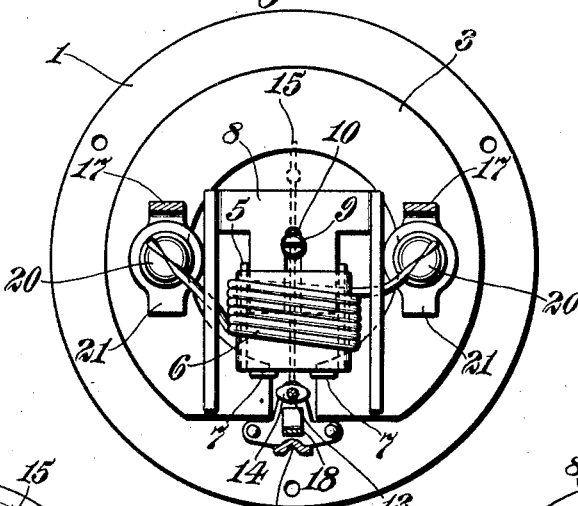
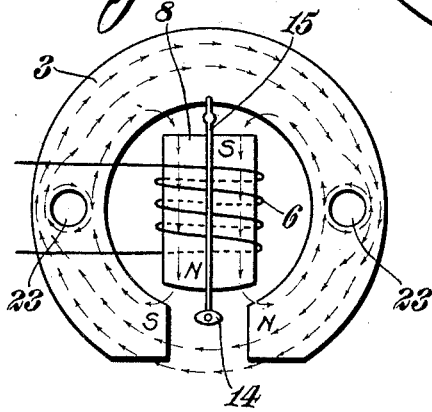
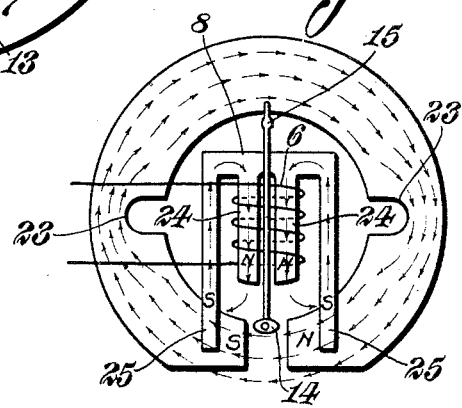
Inventor:
EDWIN C. BALLMAN,
by John N. Bruninga
His Attorney.

UNITED STATES PATENT OFFICE.

EDWIN C. BALLMAN, OF ST. LOUIS, MISSOURI, ASSIGNOR TO STAHL A. WHITTEN, OF ST. LOUIS, MISSOURI.

ELECTRIC METER.

1,393,737. Specification of Letters Patent. Patented Oct. 18, 1921.

Application filed November 15, 1918. Serial No. 262,695.

*To all whom it may concern:*

Be it known that I, EDWIN C. BALLMAN, a citizen of the United States, and residing at St. Louis, Missouri, have invented the new and useful Improvement in Electric Meters, of which the following is a specification.

This invention relates to electrical measuring instruments, and more particularly to instruments of the type in which a constant magnetic field and a magnetic field varying in accordance with the measured current, act upon a movable armature connected with the needle of the instrument to indicate the value of the measured current.

In the accompanying drawing,

Figure 1 is a diagram showing the prior form of measuring instrument;

Fig. 2 is a diagram showing a measuring instrument embodying this invention;

Fig. 3 is a face view of the instrument embodying this invention;

Fig. 4 is a section on the line 4—4, Fig. 3; and,

Fig. 5 is an enlarged detail taken on the line 5—5, Fig. 4.

The prior type measuring instrument, as shown in Fig. 1, comprises a permanent field magnet 3, an indicating armature or vane 14 movable in the field thereof, and a winding 6 provided with a core 8 of soft iron, adapted to deflect this armature. When no current flows through the winding 6, the field set up by the permanent magnet will position the armature with its attached pointer 15 at zero position on the scale; when, however, a current flows through the coil 6, then this coil will set up a magnetic field in the core 8, at right angles to the field set up by the permanent magnet, and the resultant field will be the resultant of these two fields, which will act upon the armature to position it and thereby position the pointer on the scale to indicate the value of the current flowing through the coil 6. The permanent magnet is provided with apertures 23, through which pass the current leads 20.

When a current flows through the winding or coil 6, then a flux is set up, as shown in Fig. 1, and it will be noted that a part of this flux passes through the permanent magnet, since the legs of this permanent magnet form the return path for the flux. Now this flux set up by the current flowing through the winding 6, will increase the strength of the flux in one leg of the permanent magnet, and decrease the strength in the other leg. When, therefore, the instrument is heavily loaded by the passage of a heavy current through the winding 6, there will be a partial demagnetization of the permanent magnet, caused by demagnetization beyond the retentive limit of this permanent magnet; consequently, the calibration of the instrument and the zero position of the needle will be altered. Even with ordinary loads, the distortion of the magnetism in the permanent magnet is sufficient so that the hysteresis or retentive effects of the hard steel magnet is sufficient to cause the pointer to be off of zero position when no current flows, and also effects the calibration of the instrument whether the current is increasing or decreasing.

Where, as shown in Fig. 1, the current leads pass through apertures in the permanent magnet, then a flux will be set up around these current leads, as shown in Fig. 1, on account of the closed magnetic circuits around the current leads, thereby causing a heavy disturbing flux to be set up in the permanent magnet, and effecting the accuracy of the current measurement.

These effects are especially noticeable and objectionable in instruments in which the pointer is movable to positions on opposite sides of the zero point.

One of the objects of this invention, therefore, is to provide an electrical measuring instrument which will obviate the defects of the prior type of instruments.

Another object is to provide an electrical instrument in which the indicating winding core is so constructed and arranged as to obviate permanent alteration of the strength of the field magnet by the winding.

Another object is to provide an electrical instrument in which the permanent field magnet is so constructed as to reduce the disturbing flux set up in the magnet by the current traversing the leads.

Another object is to provide a measuring instrument having an armature and an attached pointer moving to indicating positions on opposite sides of the zero point, in which the value and direction of the current will be accurately measured and indicated.

Further objects will appear from the detail description taken in connection with the accompanying drawing.

Referring now to Fig. 2 in which similar parts are designated by similar reference characters as in Fig. 1, the core 8 is in this case provided with a center leg or legs 24, carrying the winding 6, and with return legs 25 terminating adjacent the poles of the field magnet, these return legs being, however, raised sufficiently above the permanent magnet poles so as not to short-circuit the permanent flux. The core, therefore, provides nearly closed magnetic circuits independent of the magnetic circuit of the field magnet, but coöperating therewith in its action on the armature or vane 14, since the return legs paralleling the field magnet legs provide separate and distinct magnetic circuits for the flux set up by the winding 6. By providing air gaps in the core, and by making the flux path in the air or non-ferric parts of the magnetic circuits large compared to the flux path in the ferric parts, the hysteresis effect of the soft iron core is negligible.

With the construction such as shown, it will be noted that the armature or vane will, when no current flows, be positioned by the permanent flux to position the pointer at zero; when, however, a current flows through the coil 6, this coil will set up a magnetic flux in the core at right angles to the field set up by the permanent magnet, and the resultant flux will be the resultant of these two fields, which will act upon the armature or vane to position it and thereby position the pointer on the scale in accordance with the value and direction of the current flowing through the winding or coil 6. It will be noted, however, that on account of the construction and arrangement of the core 8, the flux set up in this core by the winding will traverse its own magnetic circuit and will not pass through the legs of the permanent magnet; consequently, the flux produced by the current has no demagnetizing effect upon the permanent magnet, so that permanent alteration of the strength of the field magnet by this winding is obviated. It will, of course, be understood that the demagnetizing effect is only caused by a flux traversing the permanent magnet, which has a sufficient value to effect the permanent flux in the field magnet beyond its retentive limit; consequently, the leaking flux from the core will not effect the permanent magnetism of the field magnet.

In accordance with this invention, the edge of the permanent magnet is slotted to provide air gaps connecting with the apertures 23, so that the flux set up by the current traversing the current leads is interrupted, thereby reducing it to a negligible quantity, so that its effect on the permanent magnetism of the field magnet will be well below the retentive limit; consequently, the disturbing flux is reduced to such an extent as to be negligible in its effect on the magnet.

Figs. 3, 4 and 5 illustrate a practical embodiment of this invention. In these figures, 1 designates a base of non-magetic material, and 2 a case also of non-magnetic material, and mounted on this base is the permanent field magnet 3, which as shown is of the horseshoe type, to provide a nearly closed magnetic circuit. Mounted on the base between the legs of the permanent magnet is a bracket 4 of non-magnetic material, which has an extension 5 adapted to carry the current carrying coil or winding 6 with its axis on the axis of the field magnet, so as to set up a magnetic field at right angles to the field set up by the field magnet. The extension 5 has prongs 7 bent downwardly to hold the coil 6 in position. Arranged within the coil is the soft iron core 8, which is adjustable longitudinally of the extension 5, and therefore, longitudinally of the axis of the coil, by a screw 9 passing through a slot 10 in the core and threaded into a lug 11 projecting from the extension 5. In this way the current carrying coil is supported laterally of the field magnet, but between the poles thereof.

Positioned on the base 1 is a bracket of non-magnetic material having arms 12 forming bearings for a staff 13 positioned by these arms between the poles of the field magnet. Mounted on this staff is the vane 14 of soft iron, which is positioned opposite but below the core 8, and between but above the poles of the field magnet. Mounted also on this staff is a pointer 15 of a light material, such as aluminum, moving over a scale 16 on a plate of non-magnetic material, and mounted on a pair of non-magnetic brackets 17 on the base 1. This scale has a zero point and graduations on both sides of the zero point, the pointer being normally positioned at the zero point and held in that position when no current flows by the action of the field magnet on the armature or vane 14, but being deflected by the action of the flux set up by the current carrying coil or winding 6 to a position on the scale corresponding to the value of the current, and to a position on one or the other side of the zero point in accordance with the direction of the current. The pointer 15 has an extension 18 which coöperates with a bridge 19 of the staff support to form a damper. The connections to the coil are made through binding posts or leades 20, which in this case are in the form of screws adapted also for attaching the instrument to a support. It will be understood, of course, that these screws or current leads are suitably insulated from the metal parts of the instrument, such an insulation being shown at 21.

By adjusting the soft iron core toward and from the vane 14, the effect on the current carrying coil can be varied so as to permit accurate adjustment of the instrument in the calibration of the same. In order to permit such adjustment, the dial 16 is provided with an opening 22, which is opposite the head of the screw 9.

It will thus be seen that the invention accomplishes its object. The construction and arrangement of the indicating winding core prevents demagnetization or alteration of the permanent flux in the field magnet, and the pointer will, therefore, not only always remain in correct zero position, but the calibration of this instrument is also maintained. Furthermore, the construction of the field magnet itself is such as to avoid all disturbing effects of the flux, due to the current traversing the current leads.

It is obvious that various changes may be made in the details without departing from the spirit of this invention. It is, therefore, to be understood that this invention is not to be limited to the specific construction shown and described.

Having thus described the invention, what is claimed is:

1. An electrical measuring instrument, comprising, a permanent field magnet, an indicating armature movable in the field thereof, a winding adapted to deflect said armature, and a core for said winding constructed and arranged to provide a nearly closed magnetic circuit.

2. An electrical measuring instrument, comprising, a permanent field magnet, an indicating armature movable in the field thereof, a winding adapted to deflect said armature, and a core for said winding constructed and arranged to provide a magnetic circuit parallel to but independent of the magnetic circuit of said field magnet.

3. An electrical measuring instrument, comprising, a permanent field magnet, an indicating armature movable in the field thereof, a winding adapted to deflect said armature, and a core for said winding constructed and arranged to provide a magnetic circuit parallel to but having a return path independent of said field magnet.

4. An electrical measuring instrument, comprising, a permanent field magnet, an indicating armature movable in the field thereof, a winding adapted to deflect said armature, and a core for said winding constructed and arranged to provide a magnetic circuit parallel to but coöperating with the magnetic circuit of said field magnet only near the poles thereof.

5. An electrical measuring instrument, comprising, a permanent field magnet, an indicating armature movable in the field thereof, a winding adapted to deflect said armature, and a core for said winding having a return leg paralleling said field magnet.

6. An electrical measuring instrument, comprising, a permanent field magnet, an indicating armature movable in the field thereof, a winding adapted to deflect said armature, and a core for said winding having a return leg terminating adjacent the pole of said field magnet.

7. An electrical measuring instrument, comprising, a permanent field magnet, an indicating armature movable in the field thereof, a winding adapted to deflect said armature, and a core for said winding constructed and arranged to provide a nearly closed magnetic circuit whose non-ferric component preponderates.

8. An electrical measuring instrument, comprising, a permanent field magnet, an indicating armature movable in the field thereof to indicating positions on opposite sides of a zero point, a winding adapted to deflect said armature, and a core for said winding constructed and arranged to obviate permanent alteration of the strength of said field magnet by said winding.

9. An electrical measuring instrument, comprising, a permanent field magnet having a nearly closed magnetic circuit, an indicating armature movable in the field thereof, a winding adapted to deflect said armature, and a core for said winding constructed and arranged to provide a nearly closed magnetic circuit.

10. An electrical measuring instrument, comprising, a permanent field magnet having a nearly closed magnetic circuit, an indicating armature movable in the field thereof, a winding adapted to deflect said armature, and a core for said winding constructed and arranged to provide a nearly closed magnetic circuit in parallel with the magnetic circuit of said field magnet.

11. An electrical measuring instrument, comprising, a permanent field magnet having a nearly closed magnetic circuit, an indicating armature movable in the field thereof, a winding adapted to deflect said armature, and a core for said winding constructed and arranged to provide a magnetic circuit independent of the magnetic circuit of said field magnet.

12. An electrical measuring instrument, comprising, a permanent field magnet having a nearly closed magnetic circuit, an indicating armature movable in the field thereof, a winding adapted to deflect said armature, and a core for said winding constructed and arranged to provide magnetic circuits having return paths independent of but paralleling the circuit of said field magnet.

13. An electrical measuring instrument, comprising, a permanent field magnet having a nearly closed magnetic circuit, an indicating armature movable in the field thereof, a winding adapted to deflect said armature, and a core for said winding constructed and arranged to provide magnetic circuits having return paths independent of said field magnet.

14. An electrical measuring instrument, comprising, a permanent field magnet having a nearly closed magnetic circuit, an indicating armature movable in the field thereof, a winding adapted to deflect said armature to indicating positions on opposite sides of a zero point, a winding adapted to deflect said armature, and a core for said winding constructed and arranged to obviate permanent alteration of the strength of said field magnet by said winding.

15. An electrical measuring instrument, comprising, a permanent field magnet, a deflecting winding, and supporting means adapted to convey current to said winding, and passing through said magnet, said magnet being constructed to reduce the disturbing flux set up in said magnet by the current traversing said leads.

16. An electrical measuring instrument, comprising, a permanent field magnet, a deflecting winding, and supporting means adapted to convey current to said winding, and passing through said magnet, said magnet being interrupted to provide an air gap in the magnetic circuit set up in said magnet by the current traversing said leads.

17. An electrical measuring instrument, comprising, a permanent field magnet, a deflecting winding, and supporting means adapted to convey current to said winding, and passing through apertures in said magnet, the edge of said magnet being slotted to provide air gaps connecting with said apertures.

In testimony whereof I affix my signature this 7th day of May, 1918.

EDWIN C. BALLMAN.